United States Patent
Wang et al.

(10) Patent No.: US 10,065,626 B2
(45) Date of Patent: Sep. 4, 2018

(54) FEED FORWARD AND FEEDBACK ADJUSTMENT OF MOTOR TORQUE DURING CLUTCH ENGAGEMENT

(75) Inventors: Qing Wang, Canton, MI (US); Wei Liang, Farmington Hills, MI (US); Mark Steven Yamazaki, Canton, MI (US); Walter Joseph Ortmann, Saline, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 460 days.

(21) Appl. No.: 13/446,404

(22) Filed: Apr. 13, 2012

(65) Prior Publication Data

US 2013/0274969 A1    Oct. 17, 2013

(51) Int. Cl.
| | |
|---|---|
| *B60W 10/00* | (2006.01) |
| *B60W 10/02* | (2006.01) |
| *B60W 20/00* | (2016.01) |
| *B60W 10/08* | (2006.01) |
| *B60W 10/06* | (2006.01) |
| *B60W 20/40* | (2016.01) |
| *B60K 6/48* | (2007.10) |
| *B60W 50/00* | (2006.01) |

(52) U.S. Cl.
CPC ............ *B60W 10/08* (2013.01); *B60W 10/02* (2013.01); *B60W 10/06* (2013.01); *B60W 20/00* (2013.01); *B60W 20/40* (2013.01); *B60K 6/48* (2013.01); *B60W 2050/001* (2013.01); *B60W 2050/0012* (2013.01); *B60W 2510/0216* (2013.01); *B60W 2520/105* (2013.01); *B60W 2710/083* (2013.01); *B60W 2720/106* (2013.01); *Y02T 10/6221* (2013.01); *Y02T 10/6286* (2013.01); *Y10T 477/26* (2015.01)

(58) Field of Classification Search
None
See application file for complete search history.

(56) References Cited

U.S. PATENT DOCUMENTS

| | | | |
|---|---|---|---|
| 5,121,820 A * | 6/1992 | Brown et al. ................ | 192/3.3 |
| 6,364,807 B1 * | 4/2002 | Koneda et al. .................. | 477/5 |
| 7,070,530 B2 | 7/2006 | Ai et al. | |
| 7,758,467 B2 | 7/2010 | Ashizawa et al. | |
| 2002/0170758 A1 * | 11/2002 | Shimabukuro et al. ..... | 180/65.2 |
| 2003/0229429 A1 * | 12/2003 | Zhang et al. .................. | 701/22 |
| 2006/0089232 A1 * | 4/2006 | Kobayashi et al. ............ | 477/70 |
| 2007/0056784 A1 * | 3/2007 | Joe et al. ..................... | 180/65.2 |
| 2008/0119975 A1 * | 5/2008 | Yamazaki et al. ............. | 701/22 |
| 2009/0143950 A1 * | 6/2009 | Hasegawa et al. ............ | 701/68 |
| 2009/0156355 A1 * | 6/2009 | Oh .......................... | B60K 6/48 477/5 |
| 2011/0165992 A1 * | 7/2011 | Ueno et al. ...................... | 477/9 |

(Continued)

*Primary Examiner* — Kevin P Mahne
(74) *Attorney, Agent, or Firm* — David Kelley; Brooks Kushman P.C.

(57) ABSTRACT

A hybrid electric vehicle having a motor and an engine that are selectively connected on a driveline and controlled by a controller. The controller is configured to schedule additional motor torque to compensate for engine inertia drag based upon a clutch pressure value and a clutch slip speed value during a period of clutch engagement. The controller is also configured to maintain vehicle acceleration using a proportional integral controller to adjust the motor torque during a period of clutch engagement.

20 Claims, 3 Drawing Sheets

(56) References Cited

U.S. PATENT DOCUMENTS

2011/0245034 A1\* 10/2011 Yoshida et al. .................. 477/8
2013/0012353 A1\* 1/2013 Yoshida et al. .................. 477/5
2013/0023380 A1\* 1/2013 Sah ................................. 477/5
2013/0274969 A1\* 10/2013 Wang et al. ................... 701/22

\* cited by examiner

FEED FORWARD AND FEEDBACK ADJUSTMENT OF MOTOR TORQUE DURING CLUTCH ENGAGEMENT

TECHNICAL FIELD

This disclosure relates to adjustments made to motor torque during the transient period of clutch engagement to counteract engine inertia drag, engine starting disturbances, and clutch lock-up.

BACKGROUND

Hybrid vehicle architecture may take several forms for operatively connecting a battery, electric traction motor and a combustion engine together in the driveline of the vehicle. One proposed architecture in development by the assignee of this application is a Modular Hybrid Transmission (MHT). A key enabling technology of the MHT is the Electric Converter-Less Transmission (ECLT). To replicate the torque converter function of a conventional automatic transmission, the MHT powertrain relies on active controls of a starter/alternator and a disconnect clutch before the electric motor and a launch clutch after the electric motor.

Removal of the torque converter improves the powertrain efficiency, however, the drivability of the MHT must meet comparable targets to production automatic transmissions. A major control challenge of the MHT is to absorb clunks, pulsations and vibrations in the driveline during engine starts and clutch engagement, creating a quieter, stressfree driving experience.

Without the torque converter, new challenges arise as to the coordination of the clutch, engine and motor, especially during the complicated clutch engagement transients. All the friction element control, pressure control, and the motor toque control have to be integrated seamlessly for delivering smooth wheel torque. In addition, converter-less disconnect clutch engagement is very sensitive to the clutch pressure and it is a challenging task to achieve the proper damping and smoothness during the clutch engagement.

The engine in a MHT must start smoothly and quickly and every start is accompanied by a transient clutch engagement process that results in substantial inertia drags and torque disturbances that are transferred to the driveline. The difficulty and uncertainty of estimating the engine and clutch torque caused by complicated transient dynamics make the motor torque compensation a challenging task.

During the MHT clutch engagement transient for engine starts, there are problems of oscillations arising from the excitation of the mechanical resonance by various disturbances. This resultant oscillation phenomenon is due to low damping in the driveline due to the absence of a torque converter. The electric motor torque generates torque ripples with frequencies that are motor speed dependent.

The above problems and other problems are addressed by the present disclosure as summarized below.

SUMMARY

This disclosure proposes a method to improve hybrid motor torque compensation utilizing active countermeasures to directly react and compensate for the torque disturbances during clutch engagement for engine start. The disclosed algorithm actively adjusts motor torque based on the clutch dynamics and the vehicle response.

According to one aspect of the disclosure, a hybrid vehicle is disclosed that comprises a motor, a engine, a battery for supplying power to the motor, and a controller. The controller is configured to provide a base motor torque command based upon a driver torque demand and an engine torque command; detect a period of clutch engagement after and engine start command is provided by the controller, and schedule additional motor torque to compensate for engine inertia drag based upon a clutch pressure value and a clutch slip speed value.

According to another aspect of the disclosure, a hybrid vehicle is disclosed that comprises a motor, an engine, a battery for supplying power to the motor, and a controller. The controller is configured to provide a base motor torque command based upon a driver torque demand and an engine torque command; detect a period of clutch engagement after and engine start command is provided by the controller; and maintaining vehicle acceleration using a proportional integration controller to adjust the motor torque.

According to another aspect of the disclosure, a method is disclosed for operating a hybrid vehicle having an engine that is selectively connected to a driveline by a disconnect clutch and a secondary power source. The method comprises the step of obtaining a base motor torque command, detecting a period of clutch engagement after an engine start command that ends upon full clutch engagement, scheduling additional motor torque to compensate for engine inertia drag based upon a clutch pressure value and a clutch slip speed value, and maintaining vehicle acceleration using a proportional integration controller to adjust the motor torque.

Other aspects of the disclosure will be better understood in view of the attached drawings and the following detailed description of the illustrated embodiments.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1A:
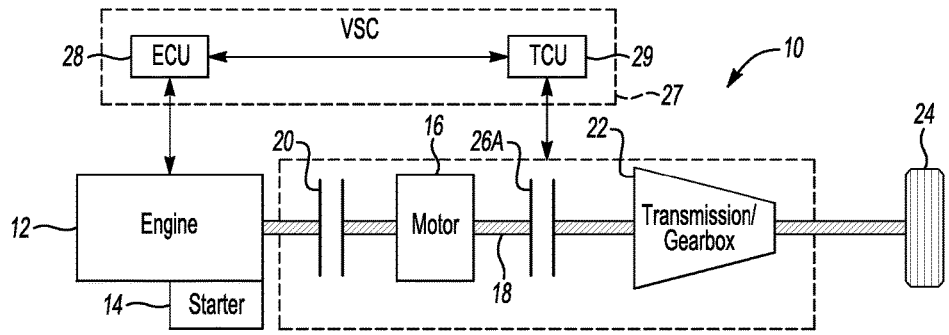
FIG. 1A is a diagrammatic view of a modular hybrid transmission system for a hybrid vehicle that does not include a torque converter.
Figure 1B:
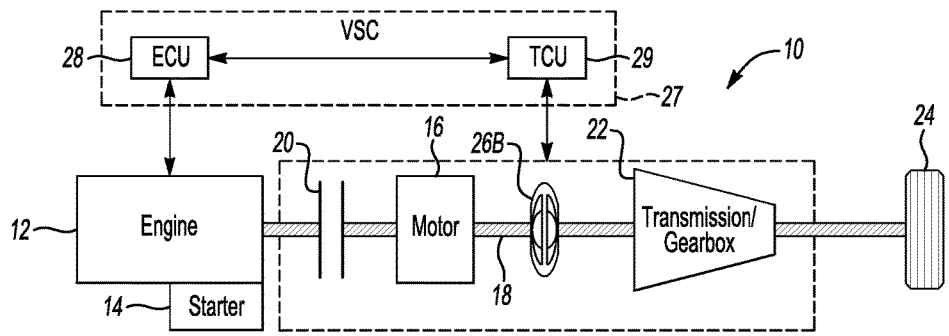
FIG. 1B is a diagrammatic view of an alternative embodiment of a modular hybrid transmission system for a hybrid vehicle that includes a torque converter.

Referring to FIGS. 1A and 1B, a modular hybrid transmission 10 is shown in a diagrammatic form. An engine 12 is operatively connected to a starter 14 that is used to start the engine 12 when additional torque is needed. A motor 16, or electric machine, is operatively connected to a driveline 18. A disconnect clutch 20 is provided on the driveline 18 between the engine 12 and the electric machine 16. A transmission 22, or gear box, is also provided on the driveline 18. Torque transmitted from the engine 12 and motor 16 is provided to the driveline 18 to the transmission 22 that provides torque to the wheels 24. A launch clutch 26 is provided between the transmission 22 and the engine 12 and/or motor 16 to provide torque through the transmission 22 to the wheels 24. As shown in FIG. 1A, launch clutch 26A is provided between the transmission 22 and the engine 12 and/or motor 16 to provide torque through the transmission 22 to the wheels 24. As shown in FIG. 1B, a torque converter 26B is provided between the transmission 22 and the engine 12 and/or motor 16 to provide torque through the transmission 22 to the wheels 24. While elimination of the torque converter is an advantage of the embodiment of FIG. 1A, the present disclosure is also advantageous in reducing vibrations in systems having a torque converter 26B like that shown in the embodiment of FIG. 1B.

The vehicle includes a vehicle system control (VSC) for controlling various vehicle systems and subsystems and is generally represented by block 27 in FIG. 1. The VSC 27 includes a plurality of interrelated algorithms which are distributed amongst a plurality of controllers within the vehicle. For example, the algorithms for controlling the MHT powertrain are distributed between an engine control unit (ECU) 28 and a transmission control unit (TCU) 29. The ECU 28 is electrically connected to the engine 12 for controlling the operation of the engine 12. The TCU 29 is electrically connected to and controls the electric machine 14 and the transmission 22. The ECU 28 and TCU 29 communicate with each other and other controllers (not shown) over a hardline vehicle connection using a common bus protocol (e.g., CAN), according to one or more embodiments. Although the illustrated embodiment depicts the VSC 27 functionality for controlling the MHT powertrain as being contained within two controllers (ECU 28 and TCU 29) other embodiments of the HEV include a single VSC controller or more than two controllers for controlling the MHT powertrain.

Figure 2:
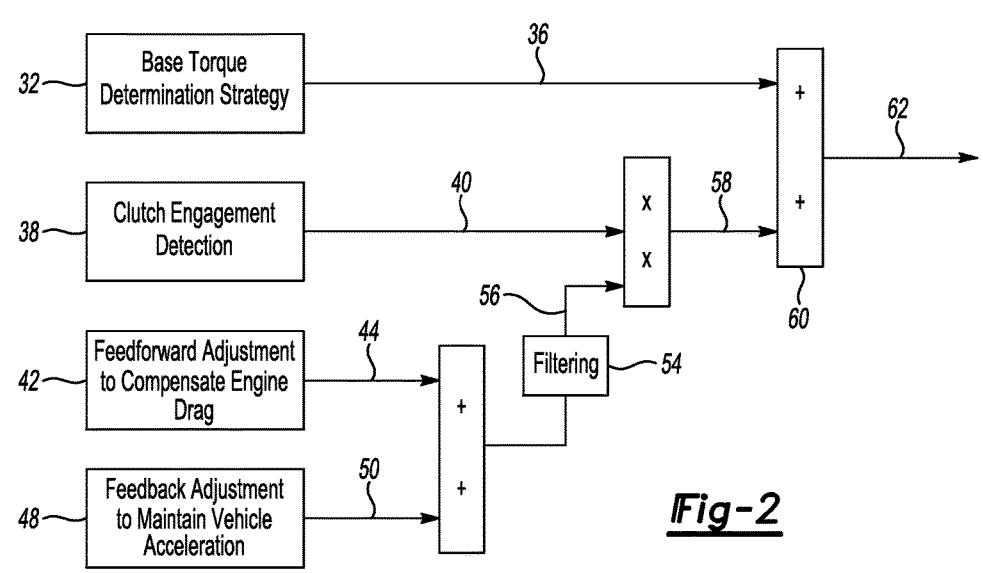
FIG. 2 is a control diagram illustrating a torque compensation algorithm that compensates for engine drag and for maintaining vehicle acceleration during engine start.

Referring to FIG. 2, an overview of the control algorithm 30 is illustrated. The VSC 27 includes a torque control algorithm 30, or strategy, disconnect clutch 20 and launch clutch 26 that permit the modular hybrid transmission 10 to function without a torque converter to obtain additional operating efficiency. The control algorithm may be contained within the TCU 29 according to one or more embodiments, or may be incorporated in hardware or software control logic as described in detail below. A base torque determination strategy 32 is developed in a torque control system which controls operation of the engine 12 and motor 16 (shown in FIG. 1) and provides a raw motor torque command output signal 36. A clutch engagement detection algorithm 38 sets a flag signal 40 in the control system when the disconnect clutch 20 is in the process of becoming engaged with the driveline. The flag is removed when the clutch is fully engaged that may be indicated by comparing the speed of rotation of the engine 12 and the motor 16. When the speed of rotation of the engine 12 and the motor 16 are equal to each other within a specified tolerance the clutch is determined to be fully engaged.

A feed forward adjustment algorithm 42 is provided to compensate for engine drag that occurs when the engine 12 is started upon actuation of the starter 14. When the starter 14 engages the engine 12 negative engine torque occurs. To compensate for the negative engine torque, the torque output of the motor 16 is ramped up before the clutch engagement period. The feed forward adjustment algorithm 42 provides an engine drag torque adjustment signal 44 that is indicative of engine drag to request that the torque output of the motor be ramped up before and during the clutch engagement period.

A feedback adjustment algorithm 48 is provided to maintain vehicle acceleration during the period of clutch engagement. When the vehicle is accelerating prior to the clutch engagement period, motor torque may be adjusted to maintain the same acceleration and thereby enhance vehicle driveability. Acceleration of the vehicle before the clutch engagement period is recorded by the controller. A filtered vehicle acceleration signal is feedback to the controller in a closed loop and an acceleration feedback signal 50 is provided.

The torque adjustment for engine drag signal 44 and the acceleration feedback signal 50 are added and filtered at block 54 to provide a motor torque adjustment signal 56. When the clutch engagement flag is set to "true" the motor torque adjustment signal is provided as a signal at 58 to be added to the raw motor torque command output signal 36 at block 60 and a motor torque command is provided at 62 to the motor 16.

Figure 3:
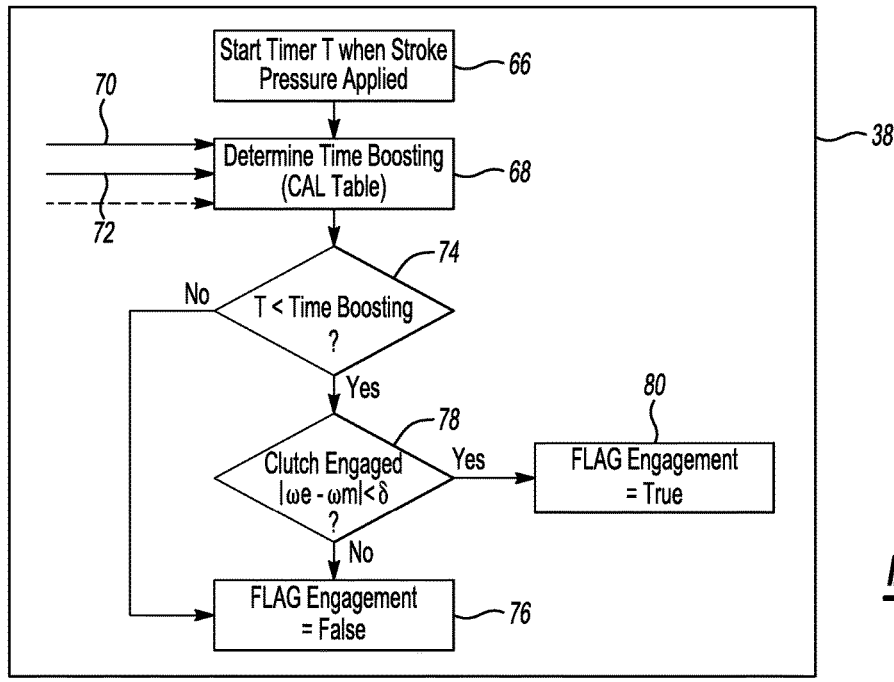
FIG. 3 is a control diagram for a transient clutch engagement detection system.

Referring to FIG. 3, the clutch engagement detection circuit 38 is shown in greater detail. The clutch engagement detection algorithm begins by starting a timer at 66. The system determines the time boosting value at 68 based upon inputs including a hydraulic oil temperature signal 70 and a hydraulic line pressure signal 72. Other signals may also be used to more closely approximate the time required to boost the clutch fluid pressure prior to beginning clutch engagement. The temperature signal 70 and line pressure signal 72 are used to determine the time boosting factor in systems where if fully disengaged the clutch pressure is permitted to fall below a stroke pressure value to zero and thereby further improve system efficiency.

In systems where the stroke pressure is always maintained by the hydraulic pump that provides hydraulic oil under pressure to the disconnect clutch 20 (as shown in FIG. 1), the step of determining the time boosting factor may be omitted. However, in a system where time boosting is required to compensate for delays relating to filling and pressurizing the disconnect clutch 20, the time T corresponding to the start of the timer when the stroke pressure is applied at 66 is compared to the time boosting value at 74. If the time T is less than the time boosting factor, the flag for clutch engagement is set to equal false at 76. Alternatively, if the time T is not less than the time boosting factor at 74, the algorithm proceeds to 78 where it is determined whether the clutch is engaged by taking the absolute value of the difference between engine speed ($\omega_e$) and motor speed ($\omega_m$). If the absolute value is less than a specified tolerance value ($\partial$), the flag is set to clutch engagement true at 80. When the flag is set at 80, block 84 (shown in FIG. 4) enables the motor torque adjustment signal to be used as will be explained below with reference to FIG. 4.

The engagement detection algorithm 38 first detects the beginning of the contact point at which the clutch force begins to drag the engine up to overcome engine inertia. The clutch travel distance and boosting time ($Time_{boosting}$) before the clutch transmits torque are approximately predictable and may be derived based upon a stored value table. The duration of $Time_{boosting}$ can be inferred from the line pressure command alone assuming that the impact of the temperature of the hydraulic oil is negligible. The relationship of $Time_{boosting}$ and line pressure can be captured in a calibration table that may be construed empirically based upon clutch engagement experimentation testing. The timing of the contact point may be inferred from the known $Time_{boosting}$ value and the known timing of the clutch pressure command. The ending point of the engagement when the clutch is fully engaged can be detected by measuring the difference between the engine and motor speeds. Clutch engagement is completed when the engine speed signal and motor speed signal are equal or the difference between the engine and motor speed is within a predetermined difference.

In systems where a minimum stroke pressure is always maintained by the hydraulic system of the clutch, the clutch engagement detection may begin with application of the stroke pressure without requiring the calculation of a $Time_{boosting}$ timing factor. In such systems, the clutch engagement flag is immediately set upon application of the stroke pressure to the clutch and terminates when the engine and motor speeds are close enough or equal as indicated previously.

Figure 4:
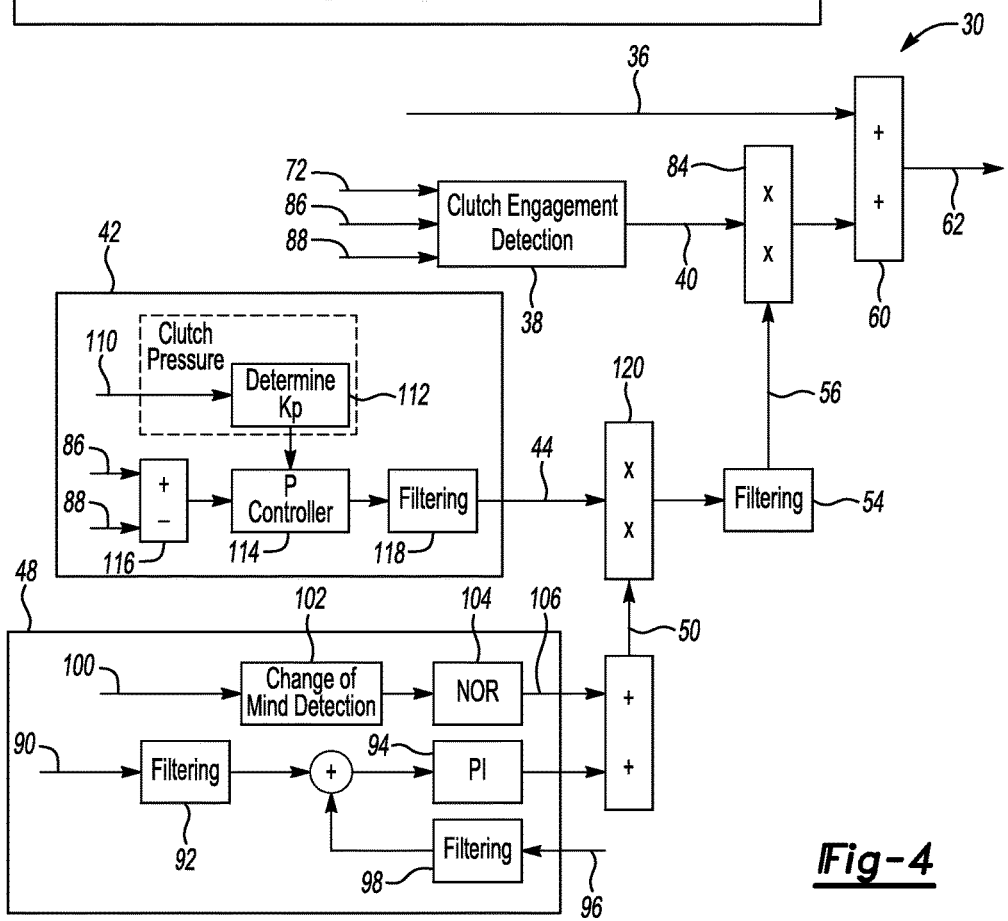
FIG. 4 is a an expanded control diagram illustrating a torque compensation algorithm that compensates for engine drag and for maintaining vehicle acceleration during engine start in greater detail.

Referring to FIG. 4, the clutch engagement detection algorithm 38 is shown to include inputs for engine speed at 86 and for motor speed at 88 that are used to determine if the clutch is engaged at 78 in FIG. 3.

In the feedback adjustment algorithm 48, an acceleration pre-engagement signal 90 is filtered at block 92 and is maintained as the set point for a PI controller 94. A vehicle acceleration signal 96 is filtered at block 98 and is provided as feedback to the PI controller 94 for closed-loop control.

The feedback adjustment algorithm 48 also receives a driver power command 100 that is evaluated by a change of mind detection algorithm at block 102. A change of mind determination may be indicated if the driver "tips out" by removing pressure from the accelerator pedal or by applying the brakes of the vehicle. One approach for detecting a change of mind "tip out" event is to determine whether the driver power command changes from dPdrv/dt>0 to dPdrv/dt<=0, wherein dPdrv/dt denotes the change in driver power over time. If a change of mind is detected at block 102 a flag is set and NOR gate 104 is set and provides a signal 106 immediately cancelling the torque feedback adjustment. If no change of mind is determined, the feedback adjustment algorithm 48 provides motor torque adjustment signal 56.

In the feed forward adjustment algorithm 42, negative engine torque during engine start is anticipated. Motor torque is ramped up based upon a clutch pressure signal 110 that is adjusted in a calibration table at block 112 to determine a value Kp for gain scheduling that is provided to P controller 114. The P controller 114 also receives the engine speed input signal 86 and the motor speed input signal 88 that are provided to a subtractor 116. The P controller 114 provides a feed forward value that is filtered at 118 and provided as the drag torque adjustment signal 44 to a block 120 to be summed with the acceleration feedback signal 50. The output of the block 120 is filtered at block 54 and the motor torque adjustment 56 is gated through the block 84. The output of the block 84 is combined with the raw motor torque command 36 at block 60 to provide a motor torque command 62 to the motor 16.

Figure 5:
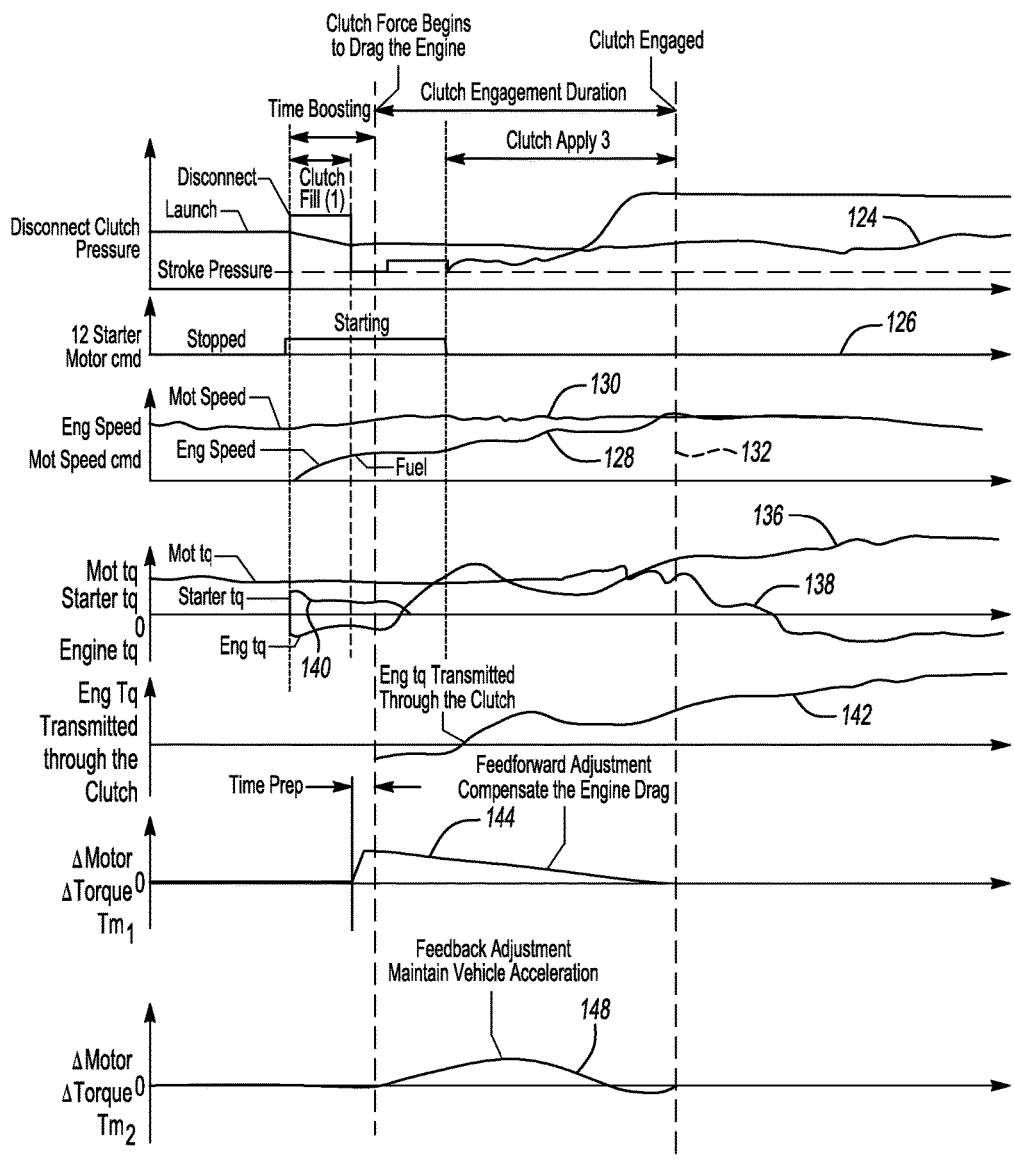
FIG. 5 is a graphical representation of a torque compensation system compensating for engine drag and for maintaining vehicle acceleration during engine start.

Referring to FIG. 5, feed forward and feedback adjustment of the motor torque is illustrated. The line illustrating the disconnect clutch pressure 124 begins at a point at which the engine is not operational and the vehicle is being powered by the electric motor. The disconnect clutch pressure 124 in systems where the stoke pressure is permitted to drop to zero is presumed to be at zero. A starter signal 126 indicates that in the initial period the starter is stopped, but upon initiation of engine operation, the starter motor 14 is initiated as indicated by the elevated portion of line 126. Upon initial start-up, maximum pressure is provided to fill the clutch 20 with hydraulic fluid. Upon filling, pressure within the clutch 20 is permitted to drop to the system stoke pressure level just prior to the time that the clutch force begins to drag the engine 12. The engine speed, shown by line 128, is initially zero, but begins to increase shortly after the initial starting command. At this point, the starter 14 has started the engine 12 and fuel is provided to the engine 12 and engine speed 128 increases as the result of the beginning of the combustion process. Engine speed 128 continues to increase until it reaches the motor speed indicated by line 130. Upon the engine speed 130 reaching the motor speed 128, a determination is made that the clutch is fully engaged.

Referring to line 136, representing the motor torque, motor torque remains relatively constant throughout the pre-starting and clutch engagement process. The engine torque, shown by line 138 is initially negative when the starter/motor begins providing starter torque as shown by line 140. Engine torque increases rapidly after the engine starts at which point the engine rotation is being assisted by both the motor torque, as shown by line 136, and by the engine torque, as shown by line 138. Transmission of engine torque through the clutch is shown by line 142 that indicates initial engine torque transmitted to the clutch 142 is negative, but as the engine torque 138 increases, the engine torque transmitted to the clutch likewise increases as shown by line 142. Full engagement of the clutch is reached at dotted line 132.

With continued reference to FIG. 5, the feed forward motor torque adjustment is represented by line 144. At the beginning of the window $Time_{prep}$ motor torque is rapidly increased just prior to beginning the clutch engagement process. The additional engine torque compensates for the negative engine torque caused by inertia drag. The increase in engine torque is gradually reduced to zero when full engagement of the clutch is achieved at 132.

Feedback adjustment to maintain vehicle acceleration is illustrated by line 148 in FIG. 5. It is estimated that starting when the clutch force begins to drag the engine, a gradual increase in motor torque is provided that adjusts the motor torque based upon the feedback. As the engine starts to produce positive torque, the request for increased motor torque peaks and is then gradually phased out. However, it should be understood that the actual shape of the torque response curve may vary from the illustrated curve. When the clutch is fully engaged and $Flag_{engagement}$ is set to false, the feedback acceleration adjustment is terminated.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hybrid vehicle comprising:
a motor;
a clutch configured to couple the motor to an engine; and
a controller programmed to,
increase motor torque by a specified value prior to engagement of the clutch during clutch pressure boost and starter motor cranking of the engine,
decrease motor torque during clutch engagement by the specified value, and
adjust motor torque during post engine start engagement of the clutch based upon clutch pressure and slip speed and vehicle acceleration to maintain vehicle acceleration.

2. The hybrid vehicle of claim 1 wherein the period of clutch engagement is terminated when a disconnect clutch between the motor and the engine is fully engaged.

3. The hybrid vehicle of claim 1 wherein the period of clutch engagement is terminated when a speed of rotation of the motor and a speed of rotation of the engine are substantially equal thereby indicating that the disconnect clutch is fully engaged.

4. The hybrid vehicle of claim 1 wherein the period of clutch engagement begins when a disconnect clutch between the motor and the engine begins to drag the engine, wherein a calibrated time window is provided prior to the beginning of the clutch engagement.

5. The hybrid vehicle of claim 4 wherein a clutch pressure signal is provided to a gain scheduling processor that obtains a feed forward torque command based upon a stored value table.

6. The hybrid vehicle of claim 1 wherein the clutch slip speed value is provided to a proportional controller that is based upon a speed of rotation of the motor and a speed of rotation of the engine, and wherein the proportional controller provides a signal requesting a change in motor torque.

7. The hybrid vehicle of claim 1 wherein the motor torque is decreased by the specified value gradually during clutch engagement until full engagement of the clutch is complete, in response to detection of negative engine torque being transferred through the clutch.

8. A hybrid vehicle comprising:
a motor;
a starter motor;
an engine and a battery for supplying power to the motor;
a clutch configured to selectively couple the motor and engine;
a torque converter configured to couple the motor to a transmission; and
at least one controller programmed to,
increase motor torque by a specified value prior to a period of clutch engagement during clutch pressure boost and starter motor cranking of the engine,
decrease motor torque during clutch engagement by the specified value, and
adjust motor torque during the period of clutch engagement after an engine start, based upon clutch pressure, clutch slip speed, and vehicle acceleration such that engine inertia drag is compensated for and vehicle acceleration is maintained.

9. The hybrid vehicle of claim 8 wherein the controller is configured to record the vehicle acceleration immediately prior to the period of clutch engagement, wherein the vehicle acceleration is provided to a proportional integral (PI) controller as a set point of the PI controller.

10. The hybrid vehicle of claim 9 wherein a filtered vehicle acceleration signal is provided to the PI controller for closed loop control.

11. The hybrid vehicle of claim 8 wherein the controller detects a change in driver demand associated with removing pressure from an accelerator pedal or by requesting application of a brake while the controller is controlling motor torque to maintain vehicle acceleration, wherein upon detecting a change in driver demand the controller discontinues maintaining vehicle acceleration.

12. The hybrid vehicle of claim 8 wherein the controller starts controlling the motor torque to maintain vehicle acceleration at the start of the period of clutch engagement and stops controlling the motor torque to maintain vehicle acceleration when the period of clutch engagement has ended.

13. The hybrid vehicle of claim 8 wherein the motor torque is decreased by the specified value gradually during clutch engagement until full engagement of the clutch is complete, in response to detection of negative engine torque being transferred through the clutch.

14. A method of operating a hybrid vehicle with a control unit, the hybrid vehicle having an engine that is selectively connected to a driveline by a disconnect clutch and a secondary power source that is coupled to a transmission by a torque converter comprising:
increasing secondary power source torque by a specified value prior to a period of clutch engagement during disconnect clutch pressure boost and starter motor cranking of the engine
decrease secondary power source torque during clutch engagement by the specified value, and
adjusting secondary power source torque during the period of clutch engagement after an engine start with the control unit, based upon a disconnect clutch pressure, a clutch slip speed, and vehicle acceleration such that engine inertia drag is compensated for and vehicle acceleration is maintained.

15. The method of claim 14 further comprising terminating the period of clutch engagement with the control unit when the disconnect clutch between the secondary power source and the engine is fully engaged.

16. The method of claim 14 wherein the period of clutch engagement begins when the disconnect clutch between the secondary power source and the engine begins to drag the engine, wherein the method further comprises inputting a calibrated time preparation window into the control unit prior to the beginning of the clutch engagement, increasing torque requested from the secondary power source prior to the beginning of the clutch engagement with the control unit, and decreasing the torque requested from the secondary power source after the beginning of clutch engagement with the control unit.

17. The method of claim 14 further comprising monitoring the vehicle acceleration with the control unit immediately prior to the period of clutch engagement, wherein the vehicle acceleration is provided as an input to a proportional integral (PI) controller as a set point of the PI controller.

18. The method of claim 14 further comprising outputting a filtered vehicle acceleration signal from the control unit and inputting the filtered vehicle acceleration signal to a PI controller for closed loop control.

19. The method of claim 14 further comprising detecting a change in driver demand associated with removing pressure from an accelerator pedal or a request for application of a brake with the control unit, while the control unit is also controlling motor torque to maintain vehicle acceleration, wherein upon detecting the change in driver demand maintaining vehicle acceleration is discontinued by the control unit.

20. The method of claim 14 wherein the secondary power source torque is decreased by the specified value gradually during clutch engagement until full engagement of the clutch is complete, in response to detection of negative engine torque being transferred through the clutch.

\* \* \* \* \*